Patented Aug. 8, 1950

2,517,777

UNITED STATES PATENT OFFICE 2,517,777

SILOXANE RESINS

Howard N. Fenn and Lawrence A. Rauner, Midland, Mich., assignors to Dow Corning Corporation, Midland, Mich., a corporation of Michigan No Drawing. Application January 21, 1946,
Serial No. 642,438

1 Claim. (Cl. 260—46.5)

The present invention relates to essentially infusible siloxane resins which have some slight thermoplasticity.

The siloxane resins are hydrophobic and of high dielectric capacity. These characteristics, together with their resistance to decomposition upon heating as compared with other organic compounds, indicate that this group of resins might have special utility for a considerable range of uses. For particular industrial uses, however, other physical properties are necessary as, for example, high physical strength, the ability to be cured in deep sections, and physical response to high temperature conditions. The curing of resins in thick sections involves special problems, and resins which cure in thin exposed sections do not necessarily cure properly upon molding in deep section.

An object of the present invention is the provision of new siloxane resins of commercial utility. Other objects and advantages will be obvious from the following description.

In the siloxanes of the present invention essentially all of the structural units are substantially as follows:

$$CH_3SiO_{1.5}$$
$$C_6H_5SiO_{1.5}$$
$$CH_3C_6H_5SiO$$

The siloxanes hereof contain at least 60 mol. per cent of the methyl siloxane structural units and less than 30 mol. per cent of the methyl phenyl siloxane structural units. Substantially the remainder of the siloxane is constituted of phenyl siloxane structural units. The silicon atoms of the various siloxane structural units are linked together by the oxygen atoms thereof in an alternating lattice of oxygen and silicon atoms. Other materials, such as metal, metal oxide or metal silicate, pigments or fibers, may be mixed with or impregnated with the siloxanes of this invention. The resins of the present invention cure to an insoluble state in a short time by heating, in which state they are solids of high physical strength. These resins may be cured either in thin films or in deep sections.

The siloxane resins of this invention contain the phenyl siloxane structural units in limited amount, since it has been found that these units in larger proportions cause the resins to be too thermoplastic.

The methyl and the phenyl siloxane structural units, in combination with the methyl phenyl siloxane units, appear to produce a joint result, which result is not produced by either one when separately combined with the methyl phenyl siloxane units. While for many purposes monomethyl siloxane structural units are the equivalent of the monophenyl siloxane structural units, in the present resins the two appear to function differently. It has been found that compositions containing the three types of structural units do not have the excessive thermoplasticity of compositions of phenyl siloxane units and methyl phenyl siloxane units, and have greater physical strength than compositions of methyl siloxane units and methyl phenyl siloxane units. Thus, the compositions of the present invention are both physically strong and are not excessively thermoplastic. Preferred compositions which augment the desirable characteristics of the three types of structural units contain at least 2 mol. per cent each of phenyl siloxane units and methyl phenyl siloxane units.

In the production of the resins of the present invention, the organosilicon derivatives which are hydrolyzed should be substantially free of hydrolyzable siliceous compounds other than those in which the only organo substituents are monomethyl, monophenyl, and methyl phenyl. The remaining valences of the silicon in these derivatives may be satisfied by any of the well known readily hydrolyzable radicals or elements such as alkoxy, aroxy and amino radicals and halogens. Such silane derivatives may be obtained by any appropriate production method, such as by simultaneously coupling methyl and phenyl Grignard reagents with silicon in the form of tetrachlor silane or ethyl orthosilicate and refining the crude reaction mixture to obtain the three desired derivatives in commercially pure form, in which form they are substantially free of other hydrolyzable siliceous compounds, including silicon tetrachloride or ethyl orthosilicate. Alternatively, the methyl and phenyl Grignard reagents may be separately reacted with silicon tetrachloride to obtain by purification monomethyl and monophenyl silicon derivatives. The methyl phenyl silicon derivative may be produced by coupling a portion of the methyl silicon derivative with a phenyl radical by a phenyl Grignard reagent or by coupling a portion of the phenyl silicon derivative with a methyl radical by a methyl Grignard reagent.

Generally, the production of siloxanes from organosilicon derivatives involves the hydrolysis of the derivatives followed by polymerization. In operation, polymerization may commence before hydrolysis is complete. Any appropriate specific method for carrying out these steps may be employed.

The hydrolysis may be readily effected by reacting the derivatives with water. An organic solvent, preferably an aromatic solvent such as benzene or toluene, may be included in the reaction mixture to collect the hydrolysis products as formed. During hydrolysis, the hydrolyzate generally polymerizes to a substantial extent with the large amounts of monomethyl siloxane employed in the resins hereof. This partially polymerized material may be further resinified by heating. The rate at which polymerization occurs at any given temperature is a function of the specific composition, the rate decreasing with decreasing monomethyl components and with increasing methyl phenyl components. Adequate polymerization may frequently be effected at room temperature, or at temperatures only slightly elevated, in reasonably short times.

When the derivatives which are hydrolyzed contain chlorides, hydrogen chloride is a product of the hydrolysis. The hydrogen chloride may be either totally or partially retained in solution in the aqueous phase, dependent upon the temperature, pressure, and amount of water present. When the monomethyl component is present as the trichloride, the formation of gels during the hydrolysis may be prevented by adding a water soluble lower aliphatic alcohol to the hydrolysis mixture. The temperature should be sufficiently low that the methyl trichlor silane does not vaporize rapidly at the pressure employed. Following hydrolysis the temperature may be raised sufficiently to drive off excess water, hydrogen chloride and any alcohol. The resin, preferably in solution, may be washed or otherwise treated to reduce its acidity.

When the derivatives include alkoxy compounds, alcohol is a product of the hydrolysis and may be retained in the aqueous phase. It is desirable to add an alcohol to the hydrolysis medium to act as a solvent. It is preferred to employ a catalyst in the aqueous phase, such as an acid or basic material, for example, hydrochloric or oxalic acid. The hydrolyzate may then be resinified in the presence of the aqueous acid by mild heating. The resinified material may be separated from the water, acid and alcohol by any appropriate procedure.

The resins of this invention, before curing, may be either solid or liquid resins, dependent upon the extent of resinification. The resins may be free of solvent, or they may be in solution in any suitable solvent, such as toluene or an acyclic petroleum thinner. These resins may be cured in thin sections, as coatings or adhesives, or in deep sections, as in molded pieces.

*Example 1*

A series of resins was prepared of the following compositions, employing reactants and reagents as indicated:

|  | No. 1 | No. 2 | No. 3 | No. 4 | No. 5 |
|---|---|---|---|---|---|
|  | Mol Per Cent | | | | |
| Composition: | | | | | |
| $CH_3SiO_{1.5}$ | 80 | 70 | 80 | 65 | 75 |
| $C_6H_5SiO_{1.5}$ | 15 | 25 | 5 | 20 | 5 |
| $CH_3C_6H_5SiO$ | 5 | 5 | 15 | 15 | 20 |
|  | Parts by Weight | | | | |
| Reagents: | | | | | |
| $CH_3Si(OC_2H_5)_3$ | 1,424 | 1,246 | 1,424 | 1,157 | 1,335 |
| $C_6H_5Si(OC_2H_5)_3$ | 360 | 600 | 120 | 480 | 120 |
| $CH_3C_6H_5Si(OC_2H_5)_2$ | 105 | 105 | 315 | 315 | 420 |
| 0.67 N. oxalic acid | 530 | 530 | 513 | 513 | 504 |
| Formula 2B alcohol | 419 | 419 | 400 | 400 | 399 |
| Toluene | 2,400 | 2,580 | 2,415 | 2,695 | 2,520 |

In each case a mixture of the ethoxy reagents was added gradually to a mixture of the oxalic acid solution and alcohol in a kettle provided with agitation and temperature control to 30° C. The addition was made in about 15 minutes, after which the temperature was rapidly raised to 60° C. where it was maintained for 7 hours. After the third hour concentrated hydrochloric acid was added in amount to give a 1.0 normal solution. At the end of the 7 hour polymerization period, the toluene was added. The solution of resin in toluene was washed free of the acid catalysts with water, filtered, and concentrated to 60–65% solids.

Each of these resins was employed to make insulating bars by mixing the resin as solution with an equal weight of asbestos, together with 2 parts of calcium stearate per 100 parts of resin-asbestos mixture. The mixture was vacuum dried at 110° C., and ground in a ball mill. The ground product was placed in a bar mold for 1 hour at 200° C. under a pressure of 2000 pounds per square inch. The bars were cured for an additional 8 hours at 200° C. in an oven. The bars had flexural strengths of 6400; 5300; 5000; 5100; and 6500 pounds per square inch, respectively. The rate of setting of these resins may be accelerated by the inclusion of a small amount of a material such as triethanol amine, magnesium oxide or the like.

Resin No. 5 of this example was employed in the production of brake block. This material had particularly desirable properties under heavy loads.

*Example 2*

Two resins were prepared of the following compositions, employing reactants and reagents as indicated:

|  | No. 1 | No. 2 |
|---|---|---|
|  | Mol Per Cent | |
| Composition: | | |
| $CH_3SiO_{1.5}$ | 63.5 | 75 |
| $C_6H_5SiO_{1.5}$ | 31.5 | 20 |
| $CH_3C_6H_5SiO$ | 5.0 | 5 |
|  | Parts by Weight | |
| Reagents: | | |
| $CH_3SiCl_3$ | 949 | 1,120 |
| $C_6H_5SiCl_3$ | 667 | 423 |
| $CH_3C_6H_5SiCl_2$ | 95.5 | 95.5 |
| Water | 332 | 332 |
| Isopropyl alcohol | 262 | 262 |
| Toluene | 1,550 | 1,425 |

In each case, the organosilicon chlorides were mixed and added to a mixture of the water, alcohol and toluene, in a kettle provided with agitation and temperature control to 25° C. The addition, which required about 2.5 hours, was made at a rate to maintain this temperature with the cooling available. The temperature was slowly raised and the reaction mixture refluxed for ½ hour. Following the reflux period, the temperature was raised to 110° C. to distill off toluene and water and to drive off hydrogen chloride. To the resin, there was added sufficient toluene to give a solution containing 25 per cent solids. This resin solution was washed four times with water and refluxed for one hour with 10 per cent of isopropyl alcohol. The solution was again washed and finally concentrated to 117 to 120° C.

Resin No. 1 was of particular value in the manufacture of brake block. The resins had viscosities of 15 and 17 centistokes, respectively. These resins were employed to make insulating bars by mixing the resins as solutions with an equal weight of asbestos, together with 2 parts of calcium stearate per 100 parts of resin-asbestos mixture. The mixture was vacuum dried at 110° C. and ground in a ball mill. The ground product was placed in a bar mold for 1 hour at 200° C. under a pressure of 2000 pounds per square inch. The bars were cured for an additional 8 hours at 200° C. in an oven. The bars had flexural strengths of 4300 and 3900 pounds per square inch, respectively.

We claim:

A resinous polysiloxane, all of the structural units of which are substantially as follows: $CH_3SiO_{1.5}$, $C_6H_5SiO_{1.5}$, and $C_6H_5CH_3SiO$ of which structural units from 60 to 80 mol percent are monomethylsiloxane units, from 2 to 30 mol percent are methylphenylsiloxane units and from 2 to 31.5 mol percent are monophenylsiloxane units, in which polysiloxane the silicon atoms are linked together by an alternate lattice of oxygen and silicon.

HOWARD N. FENN.
LAWRENCE A. RAUNER.

REFERENCES CITED

The following references are of record in the file of this patent:

UNITED STATES PATENTS

| Number | Name | Date |
|---|---|---|
| 2,258,222 | Rochow | Oct. 7, 1941 |
| 2,371,050 | Hyde | Mar. 6, 1945 |
| 2,375,998 | McGregor | May 15, 1945 |
| 2,398,672 | Sauer | Apr. 16, 1946 |
| 2,442,212 | Rochow | May 25, 1948 |
| 2,467,976 | Hyde | Apr. 19, 1949 |
| 2,470,479 | Ferguson et al. | May 17, 1949 |
| 2,486,162 | Hyde | Oct. 25, 1949 |

OTHER REFERENCES

Rochow, Journ. Amer. Chem. Soc., vol. 63, March 1941, pp. 798 to 800.